(12) United States Patent
Kahrs et al.

(10) Patent No.: US 10,751,843 B2
(45) Date of Patent: Aug. 25, 2020

(54) TURBINE WHEELS, TURBINE ENGINES INCLUDING THE SAME, AND METHODS OF FABRICATING TURBINE WHEELS WITH IMPROVED BOND LINE GEOMETRY

(71) Applicant: HONEYWELL INTERNATIONAL INC., Morris Plains, NJ (US)

(72) Inventors: Michael Kahrs, Phoenix, AZ (US); Daniel C. Crites, Mesa, AZ (US); Jude Miller, Phoenix, AZ (US); Steve Halfmann, Chandler, AZ (US); Jason Smoke, Phoenix, AZ (US); Ardeshir Riahi, Scottsdale, AZ (US); David K. Jan, Fountain Hills, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 273 days.

(21) Appl. No.: 15/639,061

(22) Filed: Jun. 30, 2017

(65) Prior Publication Data

US 2019/0001448 A1    Jan. 3, 2019

(51) Int. Cl.
*B23P 15/00*    (2006.01)
*F01D 5/02*    (2006.01)
(Continued)

(52) U.S. Cl.
CPC .............. *B23P 15/006* (2013.01); *F01D 5/02* (2013.01); *F01D 5/025* (2013.01); *F01D 5/085* (2013.01);
(Continued)

(58) Field of Classification Search
CPC .............. F05D 2220/32; Y10T 29/4932; Y10T 29/49321; Y10T 29/49323; Y10T 29/49325; Y10T 29/49341
See application file for complete search history.

(56) References Cited

U.S. PATENT DOCUMENTS

| 4,903,887 A | 2/1990 | Thrower |
| 5,106,266 A | 4/1992 | Borns et al. |

(Continued)

FOREIGN PATENT DOCUMENTS

| EP | 1920871 A1 | 5/2008 |
| EP | 3081747 A1 | 10/2016 |

(Continued)

OTHER PUBLICATIONS

English translation Lorenz WO2010088882 A2 (Year: 2010).*
Extended EP Search Report for Application 18179420.7 dated Oct. 24, 2018.

*Primary Examiner* — Jason L Vaughan
*Assistant Examiner* — Amanda Kreiling
(74) *Attorney, Agent, or Firm* — Lorenz & Kopf, LLP (57) ABSTRACT

Turbine wheels, turbine engines, and methods of fabricating the turbine wheels are provided. An exemplary method includes fabricating a turbine wheel that includes a rotor disk and a plurality of turbine blades operatively connected to the rotor disk through a blade mount. The method includes locating a cooling passage within a blade mount preliminary configuration and a cooling inlet on a surface of the blade mount preliminary configuration. A rotor disk bonding surface geometry and a blade mount bonding surface geometry are designed based upon a stress analysis of the turbine wheel and locations of the cooling passage and cooling inlet. A rotor disk production configuration and a blade mount production configuration are generated based upon the preliminary configurations. A blade mount and a rotor disk are formed based upon the production configurations. A blade ring including a plurality of blade mounts is formed and bonded to the rotor disk.

16 Claims, 5 Drawing Sheets

(51) Int. Cl.
F01D 5/30 (2006.01)
F01D 5/08 (2006.01)

(52) U.S. Cl.
CPC ......... F01D 5/3015 (2013.01); F01D 5/3061 (2013.01); *F01D 5/08* (2013.01); *F05D 2220/32* (2013.01); *F05D 2230/232* (2013.01); *F05D 2240/24* (2013.01); *F05D 2240/81* (2013.01)

(56) References Cited

U.S. PATENT DOCUMENTS

| | | | |
|---|---|---|---|
| 5,161,950 A | 11/1992 | Krueger et al. | |
| 6,331,217 B1 * | 12/2001 | Burke | B23H 9/10 148/522 |
| 6,666,653 B1 | 12/2003 | Carrier | |
| 7,832,986 B2 | 11/2010 | Baker et al. | |
| 8,187,724 B2 | 5/2012 | Rice | |
| 8,206,117 B2 | 6/2012 | Strangman et al. | |
| 8,408,446 B1 | 4/2013 | Smoke et al. | |
| 8,480,368 B2 | 7/2013 | Tolbert et al. | |
| 8,821,122 B2 * | 9/2014 | Borufka | F01D 5/082 415/115 |
| 8,918,996 B2 | 12/2014 | Wessman et al. | |
| 9,457,531 B2 | 10/2016 | Ortiz | |
| 2015/0354379 A1 | 12/2015 | Miner et al. | |
| 2016/0146024 A1 | 5/2016 | Morris et al. | |
| 2017/0022827 A1 | 1/2017 | Waldman et al. | |

FOREIGN PATENT DOCUMENTS

| | | | |
|---|---|---|---|
| EP | 3121372 A1 | 1/2017 | |
| FR | 2939833 A1 | 6/2010 | |
| FR | 2960589 A1 | 12/2011 | |
| GB | 2387203 A | 10/2003 | |
| WO | 2010/088882 A2 | 8/2010 | |
| WO | WO-2010088882 A2 * | 8/2010 | ............ F01D 5/082 |

* cited by examiner

TURBINE WHEELS, TURBINE ENGINES INCLUDING THE SAME, AND METHODS OF FABRICATING TURBINE WHEELS WITH IMPROVED BOND LINE GEOMETRY

TECHNICAL FIELD

The technical field generally relates to turbine wheels, turbine engines including the turbine wheels, and methods of fabricating the turbine wheels, and more particularly relates to turbine wheels having improved bond line geometry for bonded turbine blade/rotor disk configurations.

BACKGROUND

Gas turbine engines are generally known for use in a wide range of applications such as aircraft engines and auxiliary power units for aircraft. In a typical configuration, the gas turbine engine includes a turbine section having a plurality of sets or rows of stator vanes and turbine blades disposed in an alternating sequence along an axial length of a hot gas flow path of generally annular shape. The turbine blades are coupled to a main engine shaft through one or more rotor disks. Hot combustion gases are delivered from an engine combustor to the annular hot gas flow path, resulting in rotary driving of the turbine rotor disks which, in turn, drives the compressors and gearbox.

Advanced high performance gas turbine engines are constantly driven to achieve maximized thermodynamic efficiency, which is generally achieved by operating at higher rotor speeds and temperatures. In many gas turbine engine configurations the turbine blades are mounted at the periphery of the one or more rotor disks through a mechanical connection, e.g., through a dovetail-type connection or the like. However, the mechanical properties of the rotor disks and turbine blades may be inadequate to sustain induced loads during operation, even with selection of special materials and engineered cooling schemes. This may be especially true as efforts are made to maximize thermodynamic efficiency by maximizing rotor speeds and operating temperatures.

One approach taken to maximize temperatures and load carrying capability in turbine blades and rotor disks, particularly in the high pressure turbine (HPT) section, is to employ dissimilar materials for the rotor disks and the turbine blades while removing the stress concentrations associated to mechanical connections. The respective rotor disks and turbine blades, including the dissimilar materials, are directly bonded together as opposed to relying upon a mechanical connection. In one example, the turbine blades may be operatively connected to blade mounts, e.g., by casting the turbine blades and blade mounts together, or by brazing or welding the turbine blades to the blade mounts. The blade mounts may be operatively connected to each other forming a blade ring, such as by casting a plurality of blade mounts together or by brazing or welding blade mounts together. The creation of an integral bonded rotor requires the release of hoop stress attributable to the thermal gradients and rotation of the rotor disk. The hoop stress can be broken by slotting the blade ring and rotor disk after bonding the blade ring and rotor disk together.

With bonded turbine blade/rotor disk configurations, radial stress at a bond line between the blade ring and the rotor disk is often a concern and can lead to structural failure of the bonded turbine blade/rotor disk. Various bond line geometries have been proposed to address assembly and bonding surface area considerations. However, radial stress is still a concern with such bond line geometries. Further, various configurations of turbine wheels exhibit areas of higher radial stress along the bond line due to particular features of the turbine wheels.

Accordingly, it is desirable to provide turbine wheels, turbine engines including the turbine wheels, and methods of fabricating the turbine wheels having improved bond line geometry for minimizing radial stress at the bond line. Furthermore, other desirable features and characteristics will become apparent from the subsequent detailed description and the appended claims, taken in conjunction with the accompanying drawings and this background.

BRIEF SUMMARY

Turbine wheels, turbine engines, and methods of fabricating the turbine wheels are provided herein. In an embodiment, a method of fabricating a turbine wheel is provided, where the turbine wheel includes a rotor disk and a plurality of turbine blades that are each operatively connected to the rotor disk through a blade mount. The method includes locating a cooling passage within a blade mount preliminary configuration and a cooling inlet on a surface of the blade mount preliminary configuration. Optionally, a stress relief hole that passes through a rotor disk preliminary configuration is also located. A rotor disk bonding surface geometry of the rotor disk preliminary configuration and a blade mount bonding surface geometry of the blade mount preliminary configuration are designed based upon location of the cooling passage, the cooling inlet, and, optionally, the stress relief hole. The bonding surface geometries are further designed based upon a stress analysis of the turbine wheel. A rotor disk production configuration and a blade mount production configuration are generated based upon the respective rotor disk preliminary configuration having the rotor disk bonding surface geometry and the blade mount preliminary configuration having the blade mount bonding surface geometry. The blade mount is formed based upon the blade mount production configuration and the rotor disk is formed based upon the rotor disk production configuration, wherein the blade mount and the rotor disk are formed from dissimilar materials having different mechanical and/or thermal properties. A blade ring including a plurality of blade mounts is formed. The blade ring is bonded to the rotor disk to form a bond line. The bond line is located between the cooling passage and the optional stress relief hole, when present, and the bond line is spaced from the cooling inlet and the cooling passage.

In another embodiment, a turbine wheel includes a rotor disk and a plurality of turbine blades. Optionally, a stress relief hole passes through the rotor disk. Each turbine blade is operatively connected to the rotor disk through a blade mount. The blade mount is bonded to the rotor disk at a blade mount bonding surface of the blade mount and a rotor disk bonding surface of the rotor disk to form a bond line. The rotor disk bonding surface of the rotor disk and the blade mount bonding surface of the blade mount have a geometry to minimize radial stress at the bond line. The blade mount and the rotor disk have a fore surface on a higher pressure side thereof and an aft surface on a lower pressure side thereof. The blade mount includes a blade attachment surface extending between and connecting the fore surface and the aft surface thereof. The turbine blade extends from the blade attachment surface. A gap is defined between adjacent blade mounts, separating the blade mounts and extending into the rotor disk.

In another embodiment, a turbine engine includes a turbine wheel. The turbine wheel includes a rotor disk and a plurality of turbine blades. Optionally, the rotor disk has a stress relief hole passing through the rotor disk. Each turbine blade is operatively connected to the rotor disk through a blade mount. The blade mount is bonded to the rotor disk at a blade mount bonding surface of the blade mount and a rotor disk bonding surface of the rotor disk to form a bond line. The rotor disk bonding surface of the rotor disk and the blade mount bonding surface of the blade mount have a geometry to minimize radial stress at the bond line. The blade mount and the rotor disk have a fore surface on a higher pressure side thereof and an aft surface on a lower pressure side thereof. The blade mount includes a blade attachment surface extending between and connecting the fore surface and the aft surface thereof. The turbine blade extends from the blade attachment surface. A gap is defined between adjacent blade mounts, separating the blade mounts and extending into the rotor disk. A fore seal plate has a fore plate edge, and the fore plate edge abuts the fore surface of the blade mounts about a circumference of the turbine wheel. Optionally, an aft seal plate is also present and has an aft plate edge that abuts the aft surface of the blade mounts about the circumference of the turbine wheel.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the turbine wheels, turbine engines including the turbine wheels, and methods of fabricating the turbine wheels as described herein. Furthermore, there is no intention to be bound by any theory presented in the preceding background or the following detailed description.

Embodiments of the present disclosure are generally directed to turbine wheels, turbine engines, and methods of fabricating the turbine wheels. For the sake of brevity, conventional techniques related to turbine engine design and fabrication may not be described in detail herein. Moreover, the various tasks and process steps described herein may be incorporated into a more comprehensive procedure or process having additional steps or functionality not described in detail herein. In particular, turbine wheels, turbine engines, and methods of fabricating turbine wheels are well-known and so, in the interest of brevity, many conventional steps will only be mentioned briefly herein or will be omitted entirely without providing the well-known process details.

As contemplated herein, turbine wheels, turbine engines including the turbine wheels, and methods of fabricating the turbine wheels are provided in which improved bond line geometry is achieved for minimizing radial stress at the bond line. More particularly, the turbine wheel includes a rotor disk and a plurality of turbine blades each operatively connected to the rotor disk through a blade mount. "Operatively connected," as referred to herein, means that the referenced parts are connected by casting the parts together, by brazing or welding the parts together, by diffusion bonding or hot isostatic pressing (HIP), or by otherwise bonding the parts together in the absence of a mechanical connection such as dovetails, keyhole connections, or the like where physical contours or frictional forces maintain the connection between the parts. The blade mounts, as referred to herein, are portions of the turbine wheel that include a single turbine blade and that are directly bonded to the rotor disk. The blade mounts and rotor disk are formed from dissimilar materials, i.e., materials having a different mechanical and/or thermal properties such as different strength, fatigue, and crack growth capabilities, due to design and operating environment considerations. To form the turbine wheels, the blade mounts may be bonded or cast together to form a blade ring, followed by bonding the blade ring to the rotor disk. Due to bonding of the dissimilar materials, thermal gradients, and the rotation induced stress in the unbroken ring, hoop stress arises in the blade ring and the rotor disk. To relieve the hoop stress, the blade ring and the rotor disk are slotted along a radius thereof, i.e., a common radius of the rotor disk and the blade mount, to thereby form a gap between adjacent blade mounts, with the gap separating the blade mounts and extending into the rotor disk.

The methods as contemplated herein are suited for cooled turbine wheels in which the blade mount includes a cooling passage. Because the blade mount includes the cooling passage, mass of the blade mount on a side of the bond line that is radially opposite a turbine wheel axis of rotation cannot be reduced to the same extent as uncooled blade mounts, thereby limiting an ability to minimize radial stress at the bond line by shifting the bond line toward the blade mount. In accordance with the methods described herein, a rotor disk bonding surface geometry of a rotor disk preliminary configuration and a blade mount bonding surface geometry of a blade mount preliminary configuration are designed based upon location of the cooling passage, the cooling inlet, and further based upon a stress analysis of the turbine wheel. Because radial stress along the bond line is concentrated at various locations along the bond line and varies along a length of the bond line, the rotor disk bonding surface geometry and the blade mount bonding surface geometry can be configured to minimize blade mount material between the blade mount bonding surface and the cooling passage at areas of greatest radial stress, based upon the stress analysis. The rotor disk bonding surface geometry and the blade mount bonding surface geometry can also be configured based upon clearance of other features in the blade mount and/or rotor disk to minimize radial stress. In this matter, improved bond line geometry can be achieved whereby radial stress at the bond line is minimized.

The turbine wheels, as described herein, may be useful in any gas turbine engine, and may be particularly useful in HPT sections of the gas turbine engines. The turbine wheel and turbine engines may be used in many industries including aerospace and industrial such as for applications including electricity generation, naval propulsion, pumping sets for gas and oil transmission, aircraft propulsion, automobile engines, and stationary power plants.

Figure 1:
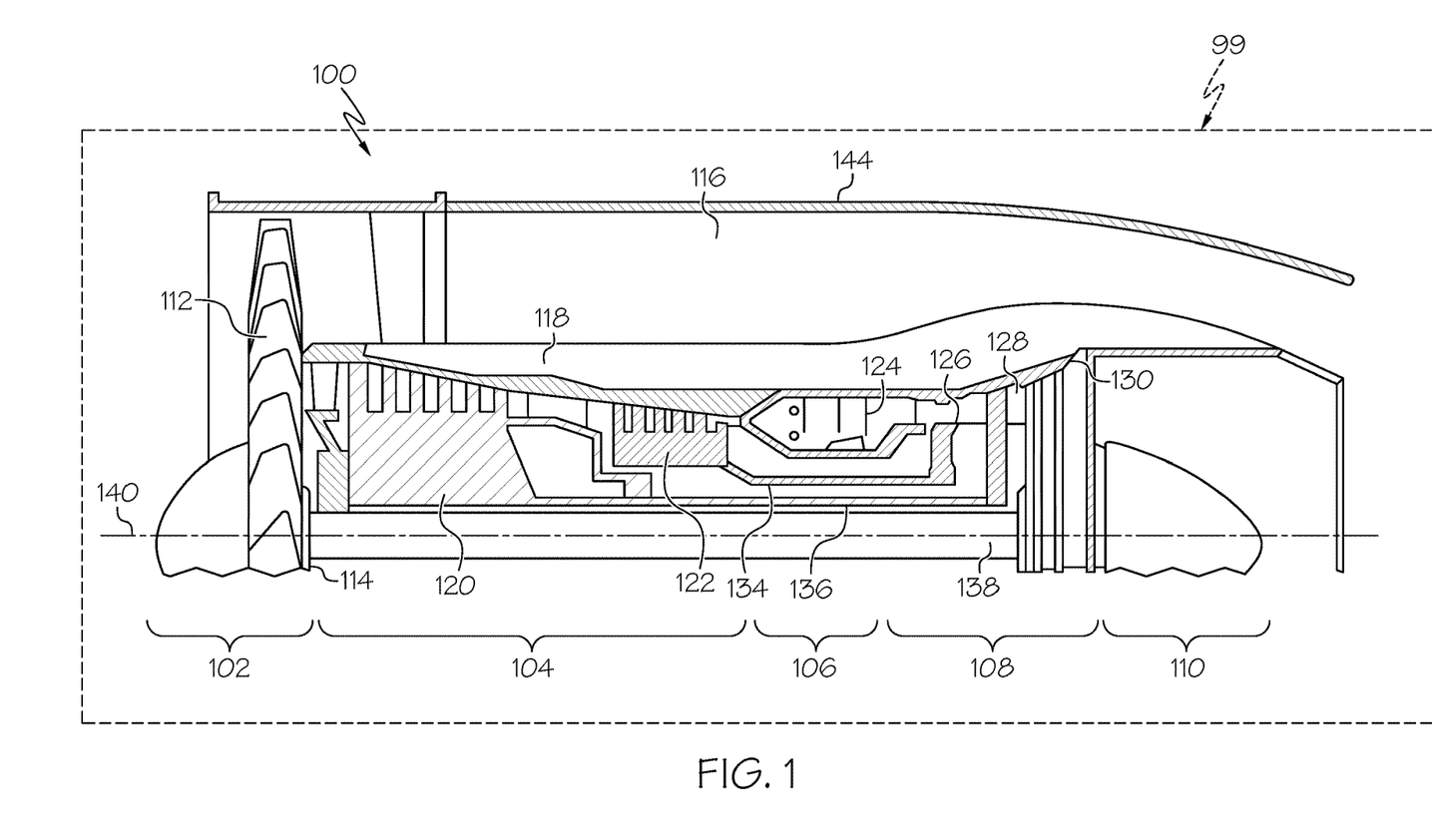
FIG. 1 is a schematic partial, cross-sectional view of an exemplary turbine engine accordance with an embodiment.

With reference to FIG. 1, a partial, cross-sectional view of an exemplary turbine engine 100 is shown with the remaining portion of the turbine engine 100 being axi-symmetric about a longitudinal axis 140, which also includes an axis of rotation for the gas turbine engine 100. In the depicted embodiment, the turbine engine 100 is a multi-spool turbofan gas turbine jet engine 100 within an aircraft 99, although other arrangements and uses may be provided. Components of the gas turbine engine 100 may be, for example, also found in an auxiliary power unit ("APU").

In this example, the turbine engine 100 includes a fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108 via an inner bypass duct.

In the embodiment of FIG. 1, in the combustor section 106, which includes a combustion chamber 124, the high pressure air is mixed with fuel and combusted. The high-temperature combusted air is then directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature combusted air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
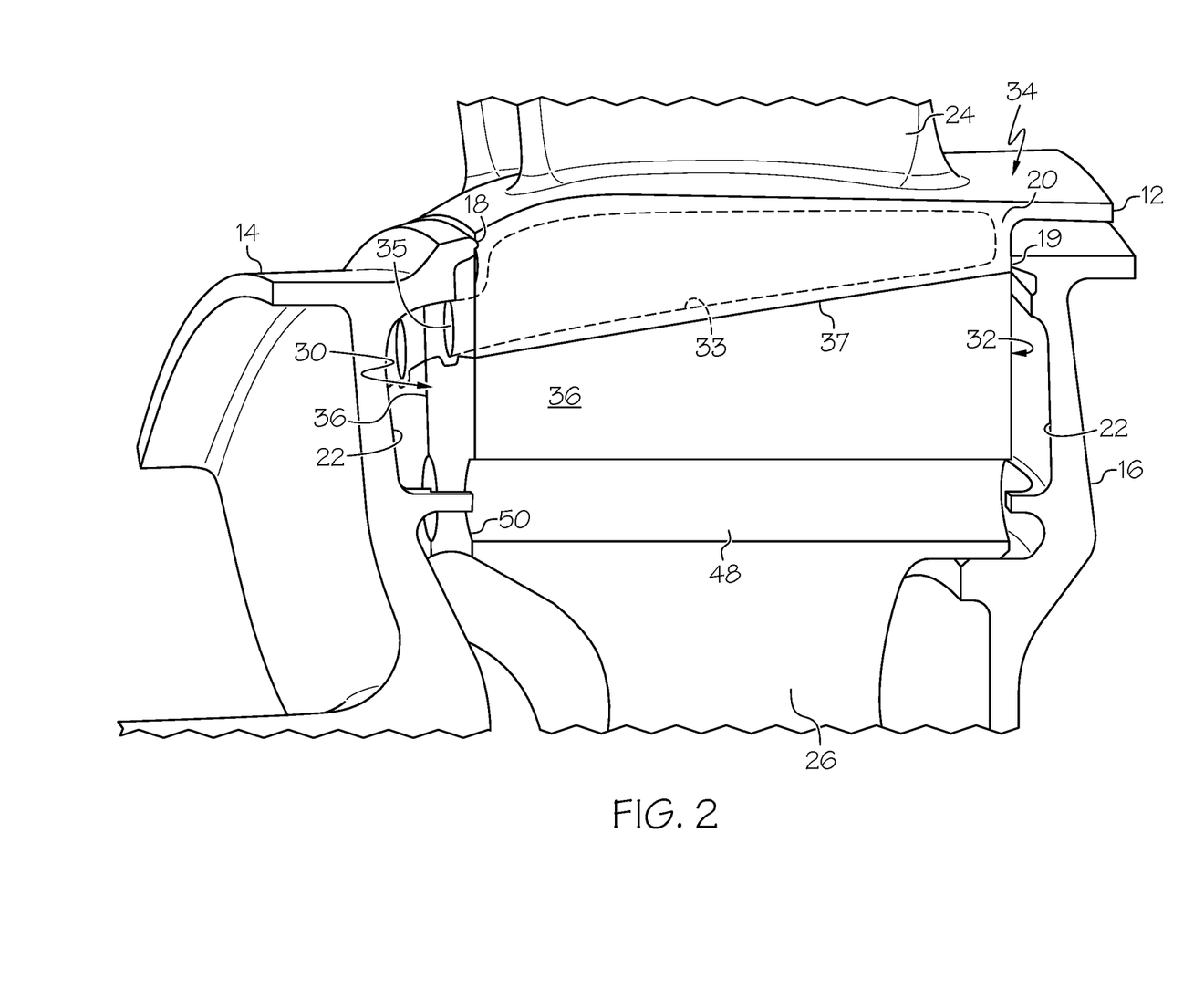
FIG. 2 is a cut-away three-dimensional side view of a portion of the turbine engine of FIG. 1 in accordance with an embodiment.

Referring to FIG. 2, a section of the turbine engine 100 that includes a turbine wheel 12 and a fore seal plate 14 will now be described in detail. As alluded to above, the turbine wheel 12 and the fore seal plate 14 may be located in the high pressure turbine 126 of the turbine engine 100. In the embodiment shown in FIG. 2, the turbine engine 100 further includes an aft seal plate 16, although it is to be appreciated that the aft seal plate 16 may be omitted in other embodiments. Referring again to FIG. 2, the fore seal plate 14, which is located on an upstream, a higher pressure side of the turbine wheel 12 hereinafter referred to as the "fore side," has a fore plate edge 18 that abuts a fore surface 30 of the blade mounts 20 about the circumference of the turbine wheel 12. In embodiments, the fore seal plate 14 and the turbine wheel 12 define a cooling cavity 22 therebetween. The cooling cavity 22 is in fluid communication with a cooling fluid source (not shown) that is isolated from a gaseous environment surrounding the turbine blades 24 during operation of the turbine engine 100. Further, the cooling cavity 22 is sealed from gaseous communication between the cooling cavity 22 and the gaseous environment surrounding the turbine blades 24, e.g., by the fore plate edge 18 in cooperation with the fore surface 30 of the blade mounts 20. In embodiments and as shown in FIG. 2, the optional aft seal plate 16 has an aft plate edge 19 that abuts an aft surface 32 of the blade mounts 20 about the circumference of the turbine wheel 12, on a downstream, lower pressure side of the turbine wheel 12 hereinafter referred to as the "aft side."

Referring again to FIG. 2, the turbine wheel 12 includes a rotor disk 26 and a plurality of the turbine blades 24. Each turbine blade 24 is operatively connected to the rotor disk 26 through a respective blade mount 20, with the bond between the rotor disk 26 and the respective blade mounts 20 shown at bond line 37. The bond line 37 is described in further detail below. The turbine wheel 12 may be formed by providing the turbine blades 24 operatively connected to the respective blade mounts 20, e.g., by casting the turbine blades 24 and blade mounts 20 together, or by brazing or welding the turbine blades 24 to the blade mounts 20. In one example, the turbine blades 24 and respective blade mounts 20 are unitary and do not rely upon a mechanical connection to remain joined. A plurality of the blade mounts 20 are operatively connected to form a blade ring, e.g., by casting the blade mounts 20 together to form the blade ring or brazing or welding the blade mounts 20 together.

As alluded to above, the blade mount 20 and the rotor disk 26 have the fore surface 30, which is on the fore side of the turbine wheel 12, and the blade mount 20 and the rotor disk 26 have the aft surface 32, which is on the aft side of the turbine wheel 12. The fore surface 30 and the aft surface 32 are opposite and generally parallel to each other. The blade mount 20 further includes a blade attachment surface 34 that extends between and connects the fore surface 30 and the aft surface 32. The turbine blade 24 extends from the blade attachment surface 34 of each blade mount 20.

A gap 36 is defined between adjacent blade mounts 20. In one example, the gap 36 separates the blade mounts 20 and extends into the rotor disk 26. The gap 36, as referred to herein, is an interface between surfaces of adjacent blade mounts 20, and the surfaces of the adjacent blade mounts 20 may be in direct physical contact at various points therealong, but are not bonded to each other. The gap 36 may be formed by slotting a blade ring of blade mounts 20 after bonding the blade ring to the rotor disk 26 during formation of the turbine wheel 12 to release hoop stress.

In embodiments and as shown in FIG. 2, the gap 36 further includes a stress relief hole 48 passing through the rotor disk 26. The stress relief hole 48 is defined by and within the rotor disk 26. The stress relief hole 48 has a stress relief hole opening 50 in the fore surface 30. In embodiments and as shown in FIG. 2, the stress relief hole 48 is exclusively defined by and within the rotor disk 26, i.e., no portion of the stress relief hole 48 is defined by the blade mount 20. It is to be appreciated that, while the stress relief hole 48 and the stress relief hole opening 50 are shown in the Figures with generalized configurations, various alternative configurations are also possible such as a "J" slot or more complex geometries rather than a linear bore. Further, it is to be appreciated that the stress relief hole 48 and the stress relief hole opening 50 can be above, extend to, or can be below the bond line 37.

In the embodiment shown in FIG. 2, the cooling cavity 22 is defined on both the fore side and the aft side of the turbine wheel 12, with fluid communication between the fore side and the aft side facilitated through the stress relief hole 48. In embodiments and as shown in FIG. 2, the blade mount 20 further includes a cooling passage 33 within the blade mount 20 and a cooling inlet 35 on a surface, e.g., the fore surface 30, of the blade mount 20. Although not shown in the Figures, it is to be appreciated that, in embodiments, the cooling inlet may be located on the aft surface 32 instead of the fore surface 30. The cooling passage 33 is in fluid communication with the cooling passage 33 for providing entry of cooling air from the cooling cavity 22 into the cooling passage 33. In the embodiments as shown, the cooling passage 33 is entirely contained within the blade mount 20 and, optionally, the associated turbine blade 24, i.e., the cooling passage 33 is not defined in or by the rotor disk 26.

As alluded to above, the blade mount 20 is bonded to the rotor disk 26 at the bond line 37. More specifically, the blade mount 20 is bonded to the rotor disk 26 at a blade mount bonding surface of the blade mount 20 and a rotor disk bonding surface of the rotor disk 26 to form the bond line 37. For ease of illustration, the bond line 37 is enumerated in place of the separate blade mount bonding surface and rotor disk bonding surface, although it is to be appreciated that those surfaces meet and are brazed or otherwise bonded together at the bond line 37. The rotor disk bonding surface of the rotor disk 26 and the blade mount bonding surface of the blade mount 20 have a geometry to minimize radial stress at the bond line 37. In embodiments, the rotor disk bonding surface and the blade mount bonding surface of the blade mount have the geometry to minimize radial stress at the bond line 37 along an entire length of the bond line 137, with the entire bond line 37 designed with consideration of radial stress at all portions of the bond line 37. In other embodiments, only portions of the bond line 37 are designed with consideration of radial stress, e.g., with areas of high radial stress factored in during design of the mount bonding surface of the blade mount 20 and the rotor disk bonding surface of the rotor disk 26. Further, in embodiments, the rotor disk bonding surface of the rotor disk 26 and the blade mount bonding surface of the blade mount 20 have the geometry to minimize thickness of blade mount material between the blade mount bonding surface and the cooling passage 33 along an entire length of the bond line 37. Methodology for designing the bonding surfaces is described in further detail below.

The considerations of radial stress and location of the cooling passage, optionally along with consideration of location of additional features in the rotor disk 26 and/or the blade mount 20, give rise to various bond line geometries. For example, in the embodiment shown in FIG. 2, the bond line 37 generally follows the contours of lowermost boundaries of the cooling passage 33 and the cooling inlet 35, allowing for sufficient thickness of the blade mount material to enable operable connection between the rotor disk bonding surface and the blade mount bonding surface without compromising physical integrity of the blade mount 20. Furthermore, additional features in the rotor disk 26 and/or the blade mount 20 may also factor into bond line geometry for the embodiment shown in FIG. 2. For example, location of the stress relief hole opening 50, when present, and a location on the aft surface 32 where the aft plate edge 19 abuts the blade mounts 20 about the circumference of the turbine wheel 12 may also be considered in design of the rotor disk bonding surface and the blade mount bonding surface. Also in this embodiment, the rotor disk bonding surface and the blade mount bonding surface have complementary shapes that still enable ingress/egress of the rotor disk 26 and the blade ring during assembly such that the rotor disk 26 can engage the blade mounts 20 that are formed into the blade ring during fabrication.

As also shown for the embodiment of FIG. 2, the rotor disk bonding surface and the blade mount bonding surface may have circumferentially irregular geometries relative to the rotational axis of the turbine wheel 12, resulting in the bond line 37 that is irregular at the fore surface 30 and aft surface 32 of the turbine wheel 12. More specifically, the geometries meander in the circumferential direction relative to the axis (not shown), with portions of the resulting bond line 37 closer to the rotational axis of the turbine wheel 12 than other portions of the bond line 37. In this manner, mass of the blade mount 20 on the side of the bond line 37 that is radially opposite the turbine wheel axis of rotation can be further reduced to alleviate radial stress at the bond line 37.

Figure 3A:
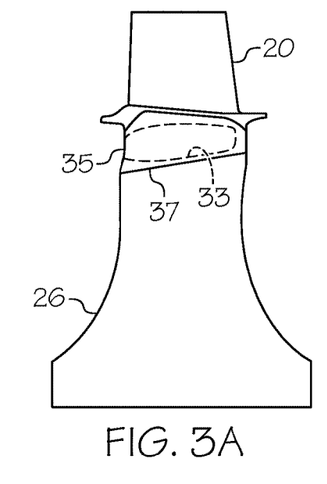
FIGS. 3A-3F are cross-sectional side views of various embodiments of turbine engines showing different bond line geometries.
Figure 3B:
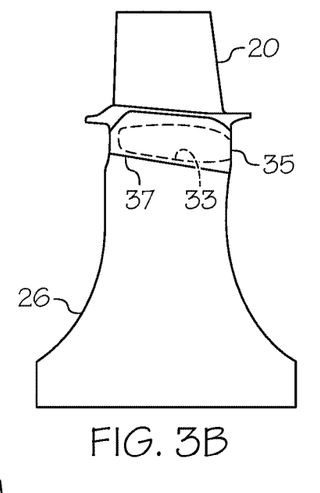
Figure 3C:
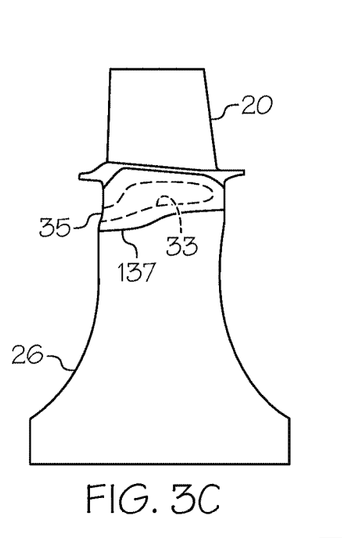
Figure 3D:
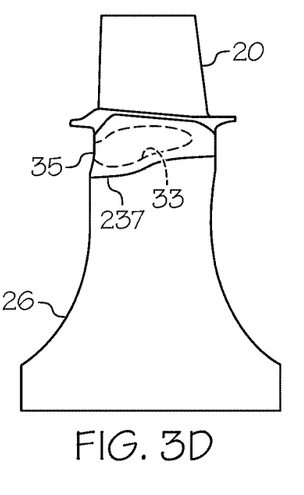
Figure 3E:
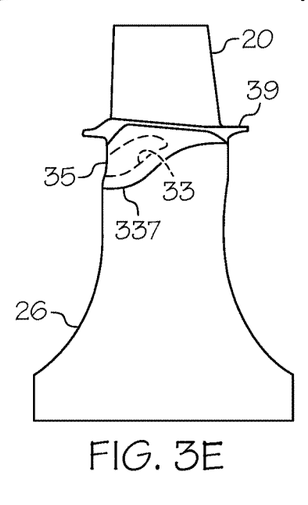
Figure 3F:
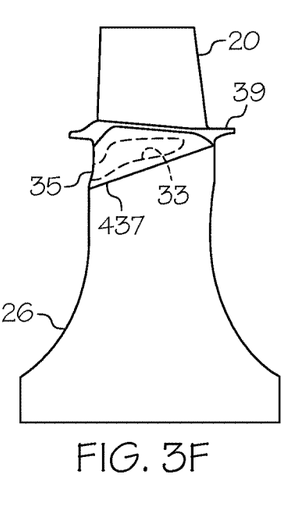
Figure 4:
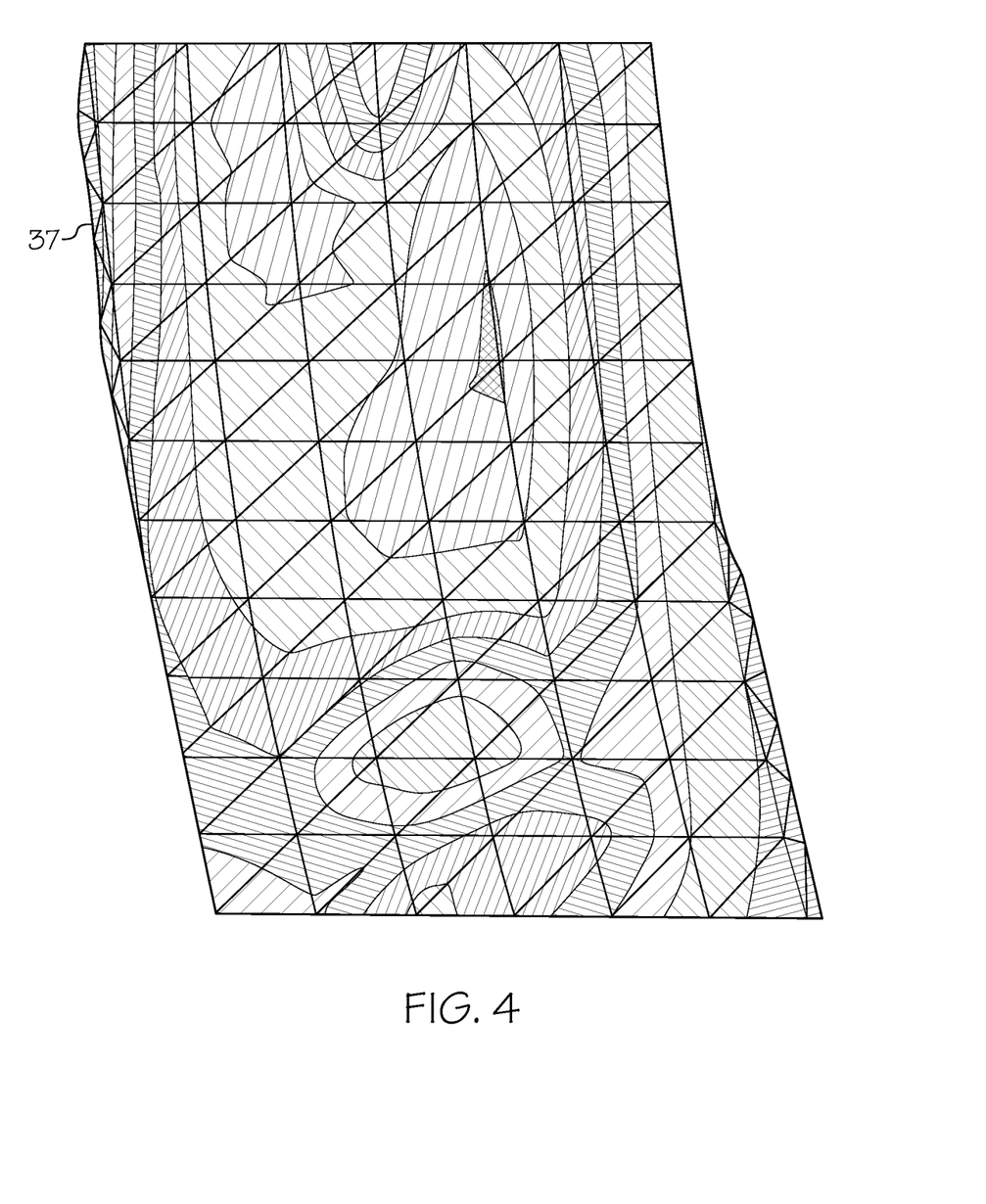
FIG. 4 is an exemplary radial stress profile as viewed radially along a bond plane as shown FIG. 3A in accordance with an embodiment.

Various alternative configurations of the blade mount bonding surface of the blade mount 20 and the rotor disk bonding surface of the rotor disk 26 are shown in FIGS. 3A-3F, illustrated at the various bond lines 37, 137, 237, 337, 437 in the respective Figures. Although FIGS. 2, 3A, and 3C-3F show the bond lines 37, 137, 237, 337, 437 sloped from the fore surface 30 to the aft surface in a direction radially outward from the axis of rotation of the turbine wheel 12, it is to be appreciated that in other embodiments and as shown in FIG. 3B the bond line may be sloped radially inward from the fore surface 30 to the aft surface 32. The bond lines generally follow the lowermost boundaries of the cooling passage 33 and the cooling inlet 35, with the particular geometry developed based upon radial stress analysis. In particular, as shown in FIGS. 2 and 3A, the bond line 37 may have a constant slope from one surface of the turbine wheel 12, e.g., the fore surface 30, to the opposing surface, e.g., the aft surface 32. While FIGS. 3A and 3C-3F illustrate the cooling inlet 35 on a fore surface of the turbine wheel, it is to be appreciated that in other embodiments, and as shown in FIG. 3B, the cooling inlet may alternatively be located on the aft surface. It is also to be appreciated that location of the cooling inlet on the aft surface will reverse the angle of the bond line, with the bond line at the fore surface being located further from a rotational axis of the turbine wheel than the bond line at the aft surface as shown in FIG. 3B. In other embodiments and as shown in FIGS. 3C-3F, the bond line 137, 237, 337, 437 may have a variable slope, in these instances with a greater slope in a central area of the turbine wheel 12, optionally with planar, unsloped portions of the bond line 237 as shown in FIG. 3D, to address areas of higher radial stress. For example, as shown in FIG. 4, the central area of the turbine wheel 12 may exhibit higher radial stress such that configuration of the bond line 37, 137, 237, 337, 437 in the central area of the turbine wheel 12 may be particularly relevant to radial stress alleviation. For example, as shown in FIGS. 3E and 3F, location of ledge 39 may be limiting for the geometry of the respective blade mount bonding surface and rotor disk bonding surface.

Figure 5:
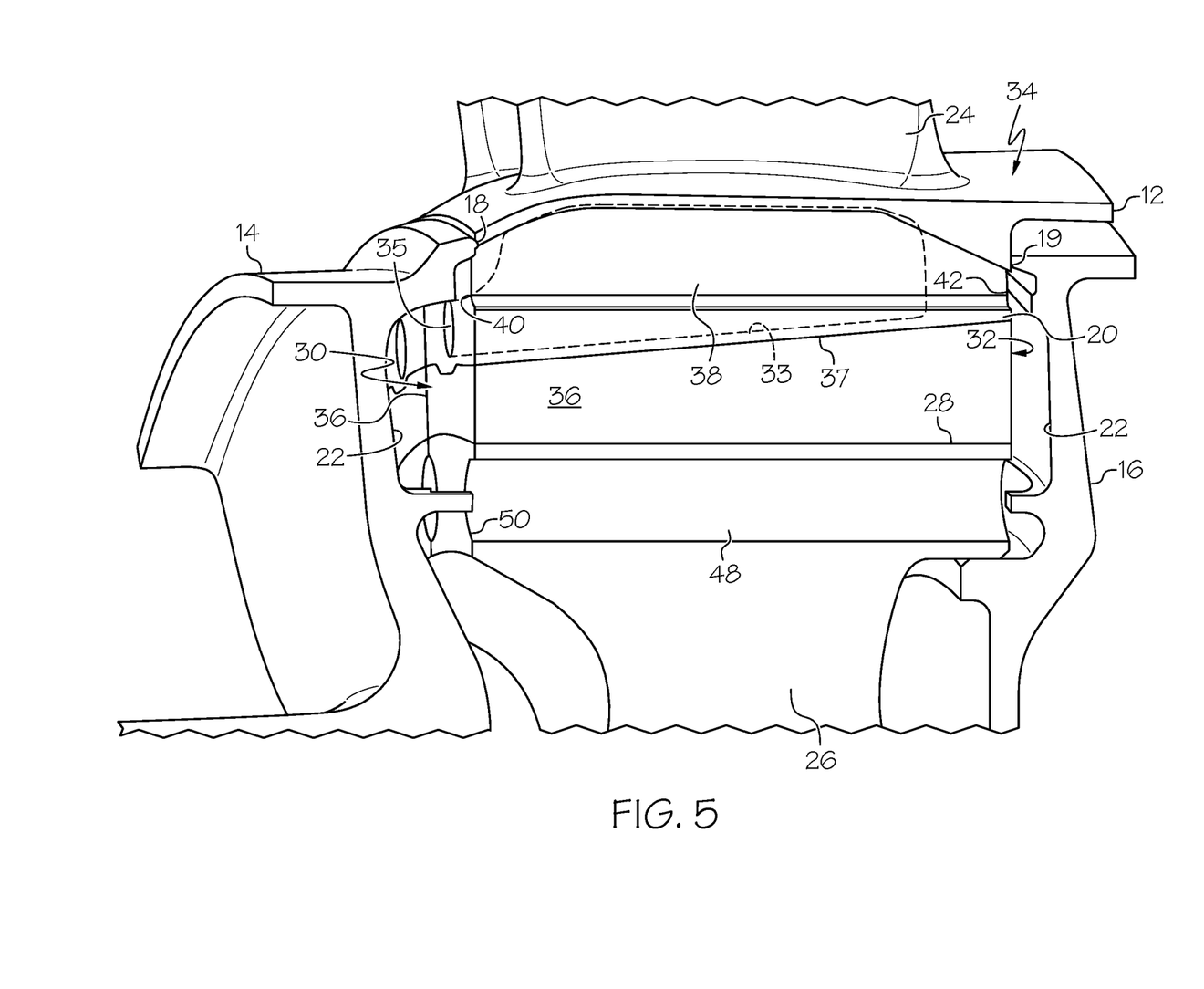
FIG. 5 is a cut-away three-dimensional side view of a portion of the turbine engine of FIG. 1 in accordance with another embodiment.

In another embodiment and as shown in FIG. 5, the gap 36 includes a pre-formed pocket 38 defined in and between adjacent blade mounts to enable effective release of the hoop stress through slotting, with the pre-formed pocket formed prior to slotting. The pocket 38 has a fore opening 40 in the fore surface 30 and, optionally, an aft opening 42 in an aft surface of the blade mounts. The turbine engine includes a fore seal plate 14 having a fore plate edge 18 abutting the blade mounts about the circumference of the turbine wheel. In embodiments and as shown in FIG. 5, the fore opening 40 is located in a contact area where the fore plate edge 18 of the fore seal plate 14 meets the blade mount 20. Each pocket 38 is defined in and between adjacent blade mounts 20. In this regard, during slotting of the blade ring during formation of the turbine wheel 12, blade ring may be slotted through the pocket 38 of adjacent blade mounts 20. In embodiments, the pocket 38 is fully contained within and between adjacent blade mounts 20, i.e., the pocket is not defined in any way by the rotor disk 26. In embodiments, only the fore opening 40 and, optionally, the aft opening 42 lead to the pocket 38. The pocket 38 is free from an opening in the blade attachment surface 34 of the blade mount 20. In this example, while the gap 36 between the adjacent blade mounts 20 opens to the blade attachment surface 34, the pocket 38 has no opening to the blade attachment surface 34. Although the gap 36 formed at the interface between adjacent blade mounts 20 leads to the pocket 38, the gap 36 is not an opening for purposes herein. In embodiments and as shown in FIG. 5, the rotor disk bonding surface and the blade mount bonding surface are designed to account for the pocket 38, with a minimal thickness of blade mount material present between the lowermost boundary of the pocket 38 and the blade mount bonding surface.

An exemplary method of fabricating a turbine wheel will now be described with reference to FIGS. 2-5. The turbine wheel includes the features as set forth above, including the rotor disk 26 and the plurality of turbine blades 24 each operatively connected to the rotor disk 26 through the blade mount 20 with the cooling passage 33 located within the blade mount 20 and the cooling inlet 35 also located on the surface of the blade mount 20. As contemplated in the exemplary method, a blade mount preliminary configuration and a rotor disk preliminary configuration are provided. The "preliminary configurations", as referred to herein, are plans of the blade mount 20 and the rotor disk 26 prior to design of a rotor disk bonding surface geometry and a blade mount bonding surface geometry. In this regard, the preliminary configurations may include some features of the respective blade mount 20 and the rotor disk 26, and may further include a preliminary blade mount bonding surface geometry and a preliminary rotor disk bonding surface geometry. More specifically, the preliminary geometries may represent stock or existing configurations of the blade mount bonding surface geometry and the rotor disk bonding surface geometry prior to designing such geometries in accordance with the methods described herein. It is contemplated that the preliminary configurations are generated by executing computer software using a microprocessor (not shown), with the preliminary configurations stored in a non-transitory computer-readable medium (not shown).

The cooling passage 33 and the cooling inlet 35 are located, or identified, within the blade mount preliminary configuration for purposes of determining boundaries of a potential blade mount bonding surface geometry. Optionally, a lowermost boundary of an additional feature in the blade mount preliminary configuration is located, wherein the opposing feature is located on an opposite surface of the blade mount preliminary configuration from the surface having the cooling inlet 35. For example, the additional feature can be the location where the seal plates 14, 16 contact the turbine wheel 12, the pre-formed pocket 38, or the like. In embodiments, the lowermost boundary of the additional feature is located radially outward from lowermost boundaries of the cooling passage 33, the cooling inlet 35, or both the cooling passage 33 and the cooling inlet 35. Optionally, the stress relief hole 48 that passes through the rotor disk preliminary configuration is also located, or identified, for purposes of determining boundaries of potential rotor disk bonding surface geometry. However, it is to be appreciated that in other embodiments, the stress relief hole 48 that passes through the rotor disk preliminary configuration may be designed after designing the rotor disk bonding surface geometry of the rotor disk preliminary configuration and the blade mount bonding surface geometry of the blade mount preliminary configuration, with the location of the stress relief hole 48, when present, dependent on the rotor disk bonding surface geometry of the rotor disk preliminary configuration and the blade mount bonding surface geometry of the blade mount preliminary configuration. Further, in embodiments it is to be appreciated that no stress relief hole may be needed. The aforementioned features can be located by using the computer software as executed by the microprocessor as described above.

A rotor disk bonding surface geometry of the rotor disk preliminary configuration and a blade mount bonding surface geometry of the blade mount preliminary configuration are designed based upon location of the cooling passage 33, the cooling inlet 35, and, optionally, the stress relief hole 48, and further based upon a stress analysis of the turbine wheel 12. Designing can include generating the surface geometries where no preliminary geometries are provided, or can include modifying, reconfiguring, or adjusting preliminary geometries in the preliminary configurations. The aforementioned features can be designed by using the computer software as executed by the microprocessor as described above, with design rules applied by the software to design the aforementioned features.

To design the bonding surface geometries based upon the stress analysis, radial stress, i.e., stress in the radial direct from the axis of rotation of the turbine wheel 12 between the blade mount 20 and the rotor disk 26 that is attributable to blade pull, is calculated. The bonding surface geometries are then designed to minimize radial stress along the bond line 37 as compared to calculated stress. For example, the bonding surface geometries may be designed with a decrease in material on a blade mount side of the bond line 37 in areas of higher stress, subject to minimum material thickness constraints between the blade mount bonding surface geometry and the cooling passage 33. More specifically, the bonding surface geometries are further designed to provide a minimal thickness of blade mount material between the cooling passage 33 and the blade mount bonding surface geometry provided that the thickness of the blade mount material between the cooling passage 33 and the blade mount bonding surface is sufficient to avoid stress failure during operation of the turbine wheel 12. To minimize the thickness of the blade mount material between the cooling passage 33 and the blade mount bonding surface geometry, radial stress levels may be analyzed relative to potential flaw size and crack growth life. For example, and referring to FIG. 4 for illustrative purposes only, local peak stress may be examined and thickness of the blade mount material between the cooling passage 33 and the blade mount bonding surface geometry may be adjusted based upon the local peak stress and material capability. Additionally, minimum material thickness constraints can also be considered between the blade mount bonding surface geometry and/or the rotor disk bonding surface geometry and additional features, e.g., the stress relief hole 48, the location where the seal plates 14, 16 contact the turbine wheel 12, the pre-formed pocket 38, and the like. The bonding surface geometries are further designed to provide that the blade ring and the rotor disk can still fit together with the surfaces in contact to facilitate formation of the bond line 37. Specific bonding surface geometries are described in detail above and shown in FIGS. 2 and 3A-3E in regards to the bond lines 37, 137, 237, 337, 437.

After designing the respective rotor disk preliminary configuration having the rotor disk bonding surface geometry and the blade mount bonding surface having the blade mount bonding surface geometry, a rotor disk production configuration and a blade mount production configuration are generated based upon the respective rotor disk preliminary configuration and the blade mount preliminary configuration. The rotor disk production configuration and the blade mount production configuration may be generated by using the computer software as executed by the microprocessor as described above.

Once the production configurations are generated, the method may proceed with production of the turbine wheel 12 through conventional techniques. More specifically, the blade mount 20 is formed based upon the blade mount production configuration and the rotor disk 26 is formed based upon the rotor disk production configuration. The blade mounts 20 and the rotor disk 26 are formed from dissimilar materials that have different mechanical and/or thermal properties, e.g., different strength, fatigue, and crack growth capabilities. The blade ring is bonded to the rotor disk 26 to form the bond line 137, with the bond line 137 located between the cooling passage 33 and the stress relief hole 48, when present. The bond line 37 is spaced from the cooling inlet 35 and the cooling passage 33 based upon the design of the rotor disk bonding surface geometry and the blade mount bonding surface geometry. After bonding the rotor disk 26 and the blade ring, the blade ring and the rotor disk 26 may be slotted along a radius thereof to thereby form the gap 36 between adjacent blade mounts, wherein the gap 36 separates the blade mounts and extends into the rotor disk 26.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims.

What is claimed is:

1. A method of fabricating a turbine wheel comprising a rotor disk and a plurality of turbine blades each operatively connected to the rotor disk through a blade mount, wherein the method comprises:
    locating a cooling passage within a blade mount preliminary configuration and a cooling inlet on a surface of the blade mount preliminary configuration;
    designing a rotor disk bonding surface geometry of the rotor disk preliminary configuration and a blade mount bonding surface geometry of the blade mount preliminary configuration based upon location of the cooling passage and the cooling inlet, and further based upon a stress analysis of the turbine wheel;
    generating a rotor disk production configuration and a blade mount production configuration based upon the respective rotor disk preliminary configuration having the rotor disk bonding surface geometry and the blade mount preliminary configuration having the blade mount bonding surface geometry;
    forming the blade mount based upon the blade mount production configuration and the rotor disk based upon the rotor disk production configuration, wherein the blade mount and the rotor disk are formed from dissimilar materials having different mechanical and/or thermal properties;
    forming a blade ring comprising a plurality of blade mounts; and
    bonding the blade ring to the rotor disk to form a bond line, wherein the bond line is spaced from the cooling inlet and the cooling passage.

2. The method of claim 1, wherein designing the bonding surface geometries based upon the stress analysis comprises generating the bonding surface geometries based upon calculated radial stress between the blade mount and the rotor disk attributable to blade pull.

3. The method of claim 2, wherein designing the bonding surface geometries comprises designing the bonding surface geometries to minimize radial stress along the bond line as compared to calculated stress.

4. The method of claim 3, wherein designing the bonding surface geometries comprises designing the bonding surface geometries with a decrease in material on a blade mount side of the bond line in areas of higher stress, subject to minimum material thickness constraints between the blade mount bonding surface geometry and the cooling passage.

5. The method of claim 1, wherein designing the bonding surface geometries further comprises designing the blade mount bonding surface geometry with a minimal thickness of blade mount material between the cooling passage and the blade mount bonding surface geometry provided that the thickness of the blade mount material between the cooling passage and the blade mount bonding surface geometry is sufficient to avoid stress failure during operation of the turbine wheel.

6. The method of claim 1, further comprising locating a lowermost boundary of an additional feature in the blade mount preliminary configuration, wherein the additional feature is located on an opposite surface of the blade mount preliminary configuration from the surface having the cooling inlet.

7. The method of claim 6, wherein the lowermost boundary of the additional feature is located radially outward from lowermost boundaries of the cooling passage and the cooling inlet, and wherein designing the blade mount bonding surface geometry comprises designing the blade mount bonding surface geometry with a minimal thickness of blade mount material between the lowermost boundary of the additional feature and the blade mount bonding surface geometry.

8. The method of claim 7, further comprising slotting the blade ring and the rotor disk along a radius thereof after bonding the blade ring to the rotor disk to thereby form a gap between adjacent blade mounts, wherein the gap separates the blade mounts and extends into the rotor disk, and wherein the gap comprises a pre-formed pocket defined in and between adjacent blade mounts and having a fore opening in a fore surface of the blade mounts and, optionally, an aft opening in an aft surface of the blade mounts.

9. The method of claim 8, wherein locating the lowermost boundary of the additional feature comprises locating a lowermost boundary of the pre-formed pocket.

10. The method of claim 9, wherein designing the bonding surface geometries comprises designing the rotor disk bonding surface geometry wherein the minimal thickness of blade mount material is between the lowermost boundary of the pre-formed pocket and the blade mount bonding surface geometry.

11. The method of claim 1, further comprising slotting the blade ring and the rotor disk along a radius thereof after bonding the blade ring to the rotor disk to thereby form a gap between adjacent blade mounts, wherein the gap separates the blade mounts and extends into the rotor disk.

12. The method of claim 1, wherein bonding the blade ring to the rotor disk comprises bonding the blade mount to the rotor disk, wherein the blade mount and the rotor disk have a fore surface on a higher pressure side thereof, an aft surface on a lower pressure side thereof, wherein the blade mount comprises a blade attachment surface extending between and connecting the fore surface and the aft surface thereof, and wherein the turbine blade extends from the blade attachment surface.

13. The method of claim 1, further comprising locating a stress relief hole passing through the rotor disk preliminary configuration and designing the rotor disk bonding surface geometry of the rotor disk preliminary configuration and the blade mount bonding surface geometry of the blade mount preliminary configuration based upon location of the stress relief hole.

14. The method of claim 13, wherein bonding the blade ring to the rotor disk forms the bond line located between the cooling passage and the stress relief hole, wherein the bond line is spaced from the cooling inlet and the cooling passage.

15. The method of claim 1, further comprising designing a stress relief hole passing through the rotor disk preliminary configuration after designing the rotor disk bonding surface geometry of the rotor disk preliminary configuration and the blade mount bonding surface geometry of the blade mount preliminary configuration.

16. The method of claim 1, wherein designing the rotor disk bonding surface geometry and the blade mount bonding surface geometry comprises designing the rotor disk bonding surface geometry and the blade mount bonding surface geometry with the geometries circumferentially irregular relative to a rotational axis of the turbine wheel.

* * * * *